United States Patent [19]  [11] 4,442,441
Kikuchi et al.  [45] Apr. 10, 1984

[54] MAGNETIC RECORDING DEVICE

[75] Inventors: Yoshiki Kikuchi; Takashi Omori; Haruhiko Moriguchi; Fujio Moriguchi; Tomio Murayama, all of Kanagawa, Japan

[73] Assignee: Fuji Xerox Co., Ltd., Tokyo, Japan

[21] Appl. No.: 235,366

[22] Filed: Feb. 19, 1981

[30] Foreign Application Priority Data

Feb. 19, 1980 [JP] Japan .................................. 55-18472
Feb. 19, 1980 [JP] Japan .................................. 55-18473
Feb. 19, 1980 [JP] Japan .................................. 55-18474
Feb. 19, 1980 [JP] Japan .............................. 55-19140[U]

[51] Int. Cl.³ ............................................ G01D 15/12
[52] U.S. Cl. .................................................. 346/74.4
[58] Field of Search ................... 346/74.4, 74 S, 76 R, 346/76 PH, 139 C; 219/216; 358/301; 360/59

[56] References Cited

U.S. PATENT DOCUMENTS

| 1,815,010 | 7/1931 | Pollock et al. | 360/59 X |
| 3,176,278 | 3/1965 | Mayer | 360/59 |
| 3,343,174 | 9/1967 | Kornei | 360/59 |
| 3,453,647 | 7/1969 | Bernstein et al. | 360/59 X |
| 3,582,570 | 6/1971 | Cushner et al. | 360/59 |
| 3,611,415 | 10/1971 | Nelson | 358/301 |
| 3,717,459 | 2/1973 | McClure | 346/74.4 X |
| 3,935,578 | 1/1976 | Condon et al. | 360/59 X |
| 3,984,809 | 10/1976 | Dertouzos et al. | 346/139 C |
| 4,314,257 | 2/1982 | Tokunaga et al. | 346/76 PH |

Primary Examiner—Thomas H. Tarcza
Attorney, Agent, or Firm—Sughrue, Mion, Zinn, Macpeak, and Seas

[57] ABSTRACT

A device for recording predetermined magnetization patterns on a magnetic recording medium such as for use in a copying machine. The magnetic medium is first magnetized with a uniform magnetization pattern then passed to a thermal printing head upon which a number of heat generating elements are arranged one-dimensionally on a supporting substrate. The heat generating elements are selectively activated to heat the recording magnetic medium to a temperature greater than the Curie temperature thereof so as to change the direction of the magnetization of the magnetic medium in cooperation with a biasing magnetic field.

10 Claims, 7 Drawing Figures

MAGNETIC RECORDING DEVICE

BACKGROUND OF THE INVENTION

The present invention relates to magnetic recording devices used to form magnetic latent images on magnetic media. More particularly, the invention relates to a magnetic recording device in which desired portions, either recording portions or non-recording portions, of a magnetic medium having a uniform magnetization pattern are selectively heated to make the magnetization pattern of the portions thus heated different from that of the remaining portions to thereby form the magnetic latent image of a picture or pattern to be recorded on the magnetic medium.

In a conventional magnetic recording device of this general type (called a magnetic photographing device or a magnetographic device), the writing of data onto a magnetic medium is carried out by magnetically reversing the polarity of desired regions of the magnetic medium which initially has a uniform magnetization pattern. In order to write a line of data with a density of about 10 magnetic heads/mm, it is necessary to provide about 1000 to 2000 magnetic heads for a standard size recording sheet. However, it is considerably difficult to manufacture magnetic heads which are arranged with such a high density.

SUMMARY OF THE INVENTION

Accordingly, an object of the invention is to eliminate the above-described drawbacks accompanying a conventional magnetic recording device.

The foregoing object and other objects of the invention have been achieved by the provision of a magnetic recording device in which a thermal printing head having about 1000 to 2000 heat generating elements arranged with a density of at least about ten heat generating elements per millimeter is disposed adjacent to a magnetic medium. The heat generating elements are selectively heated to vary the initial uniform magnetization pattern of the magnetic medium according to the data to be recorded corresponding to a picture or pattern to be reproduced to thereby form the magnetic latent image of the picture or pattern on the magnetic medium.

More specifically, the invention provides a magnetic recording device in which desired portions of a magnetic medium having an initial uniform magnetization pattern are selectively magnetized in a latent image pattern including a thermal printing head having a supporting substrate and a plurality of heat generating element arranged on the substrate, and means for applying heating current selectively to the heat generating element in accordance with data to be recorded wherein the magnetic medium is locally heated by the selected ones of the heat generating element to a temperature greater than the Curie temperature of the magnetic medium. A biasing magnetic field is applied to the portions of the magnetic medium which have been heated to change the direction of the magnetic field therein. The magnetic medium may be preheated to a temperature lower than the Curie temperature if desired. A confronting roll may be disposed confronting the thermal printing head through the magnetic medium and a biasing magnet provided inside the confronting roll for applying a biasing magnetic field to the desired portions of the magnetic medium which are heated. The biasing magnet may also be located below the thermal printing head and may be rotatably mounted to be switchable between a position to uniformly magnetize the recording medium and a position for applying the desired bias magnetization field. Also, the confronting roll may be made hollow and a yoke member disposed therein confronting the thermal recording head through which the magnetic field passes. The invention also encompasses the method by which this apparatus operates.

The nature, principle and utility of the invention will become more apparent from the following detailed description when read in conjunction with the accompanying drawings.

DESCRIPTION OF THE PREFERRED EMBODIMENTS

Figure 1:
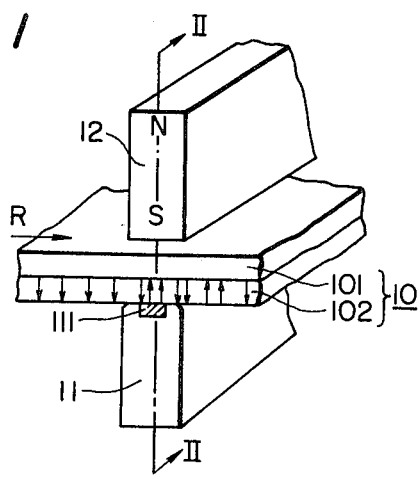
FIG. 1 is a schematic perspective view showing a first preferred embodiment of a magnetic recording device according to the invention.

FIG. 1 is a schematic perspective view of a data writing section adapted to write data on a magnetic medium in accordance with a first preferred embodiment of a magnetic recording device according to the invention.

As shown in FIG. 1, the magnetic medium 10 is made up of a base layer 101 and a magnetic film layer 102. A thermal printing head 11 is disposed adjacent to the magnetic film layer 102 while a biasing magnetic field generating magnet 12 is provided on the side of the base layer 101 confronting the thermal printing head 11 through the magnetic medium 10. The magnetic medium 10, the thermal printing head 11 and the biasing magnetic field generating magnet 12 have appropriate widths. A number of heat generating elements 111 are arranged on the surface of the thermal printing head 11 which confronts the magnetic film layer 102. In FIG. 1, the arrow R indicates the direction of movement of the magnetic medium 10.

Figure 2:
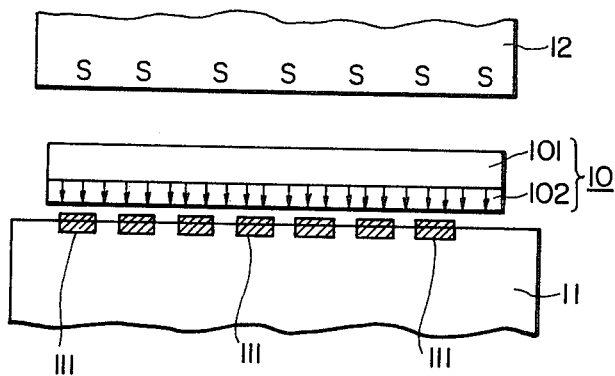
FIGS. 2 and 3 are partial sectional views taken along line II—II in FIG. 1 for a description of a data writing operation of the device shown in FIG. 1.
Figure 3:
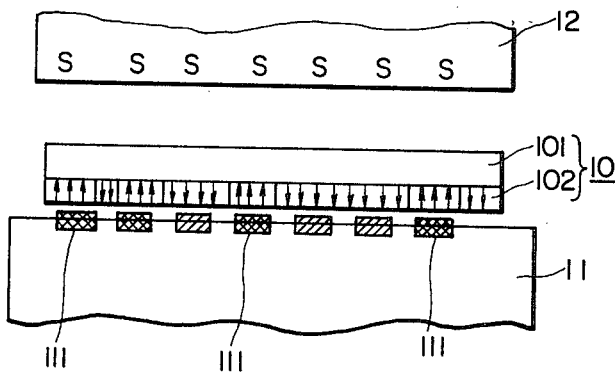

FIGS. 2 and 3 are sectional views taken along line II—II in FIG. 1. More specifically, FIG. 2 shows a state of the magnetic medium 10 before data is recorded and FIG. 3 shows a state of the magnetic medium 10 after the data has been recorded. In the magnetic recording device shown in FIGS. 1 through 3, a data writing operation is carried out as follows.

First, a preliminary operation is carried out before the data writing operation is effected. Specifically, the magnetic film layer 102 of the magnetic medium 10 is magnetized saturated in one direction as shown in FIG. 2. That is, a magnetization pattern is uniformly formed in the magnetic film layer 102. The biasing magnetic field of the magnet 12 is applied in a direction opposite to the direction of the magnetization described above. As the magnetic recording medium passes, current is applied to the heat generating elements (indicated by the cross-hatching lines in FIG. 3) which are selected according to a data signal supplied to the thermal printing head as a result of which the heat generating elements generate heat.

It is preferable that the magnetic medium 10 be made of one of copper zinc ferrite, manganese zinc ferrite, nickel zinc ferrite, chromium oxide or Gd-Co alloy. These materials have Curie temperatures or compensation temperatures lower than about 150°.

When the magnetic film layer 102 is heated to a temperature higher than its Curie temperature or compensation temperature (hereinafter, simply the Curie temperature) by the heat generating elements 111 which generate heat as described above, the magnetization of the portions of the magnetic film layer 102 thus heated is eliminated. Thereafter, the application of current to the heat generating elements 111 is suspended as a result of which the temperature of the magnetic film layer 102 decreases. When the temperature of the magnetic film layer 102 reaches the Curie temperature, the direction of magnetization of the aforementioned portions of the magnetic film layer 102 coincides with the direction of the biasing magnetic field of the magnet 12. That is, the direction of magnetization of the portions which were heated is now opposite to the direction of magnetization of the remaining portions which were not heated. The above-described operation is carried out for each of the heat generating elements on the thermal printing head to achieve the data writing operation for one line.

A conventional heat-sensitive recording head having a supporting substrate and a number of heat generating elements arranged one-dimensionally thereon can be employed, without modification, as a thermal printing head used in the invention. It goes without saying that the magnetic recording device requires some apparatus for supplying heating current to the heat generating elements selectively according to the video signal to be recorded.

The invention can further be practiced using the following modifications:

(1) As for the preliminary operations before the recording of data, the magnetic film layer of the magnetic medium is uniformly magnetized and the biasing magnetic field is applied in a direction opposite to the direction of magnetization.

(2) As for the preliminary operations before the recording of data, the magnetic film layer is demagnetized, and only the heated portions thereof are magnetized in a predetermined direction by the biasing magnetic field.

(3) In the above-described embodiment of a magnetic recording device, and in paragraph (1) above, the biasing magnetic filed is omitted. In this case, the heated portions are magnetized again by the preliminary magnetization of the magnetic film layer.

As is apparent from the above description, in accordance with the invention, a magnetic film layer having a uniform magnetization pattern (including the uniform demagnetization pattern) is locally and selectively heated so that the magnetization pattern of the heated portions of the magnetic film layer is made different from that of the remaining portions thereby to form a magnetic latent image in the magnetic medium.

The invention has the following advantageous effects:

(1) The data recording operation for one line can be carried out in one action, and accordingly the scanning operation in the main scanning direction can be eliminated.

(2) As a result of the above effect (1), the mechanical system of the magnetic recording device of the invention is simple in construction and the overall magnetic recording device can be made quite compact.

(3) The data writing speed is very high. For instance, writing data on an A4 size recording medium can be achieved in one to ten seconds.

The magnetic recording device of the invention may be so modified that a magnetic medium which has been pretreated to have a uniform magnetization pattern (which may be a uniform lack of magnetization, i.e. uniform demagnetization) is preheated to a predetermined temperature lower than its Curie temperature by a preheating heated roll following which the magnetic medium is heated by the heat generating elements. In this embodiment, the selected portions of the magnetic medium are heated to higher than the Curie temperature by the thermal printing head to be demagnetized. Then, while the magnetic medium is being cooled, the portions adjacent to the selected portions are magnetized in accordance with the biasing magnetic field which is provided separately. As a result, the selected portions of the magnetic medium have a different magnetization pattern from the remaining portions. Thus, a magnetic latent image is thus formed in the magnetic medium.

In the case where the magnetic medium is preheated by the preheating heated roll as described above, the energy applied to the heat generating elements can be small. Accordingly, each heat generating element can be made small in size which makes it possible to arrange a large number of heat generating elements with a high density yet while increasing the data writing speed.

In the above-described embodiment, a heated roll is employed to uniformly preheat the magnetic medium. However, a suitable device such as a heated plate or a heat-ray radiator may be similarly employed. Furthermore, in the case where the biasing magnetic field is omitted as described above, the heated roll may be disposed to confront the heat generating elements of the heat-sensitive recording head.

Figure 4:
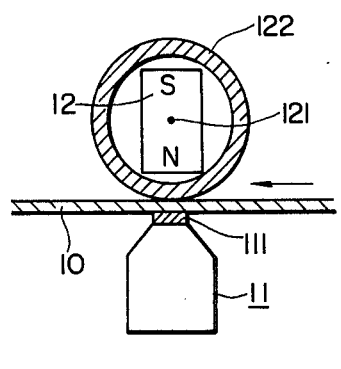
FIG. 4 is a schematic sectional view showing a second preferred embodiment of the magnetic recording device of the invention.

The magnetic recording device of the invention may be modified as shown in FIG. 4. In this embodiment, the biasing magnetic field generating magnet 12 is incorporated in a roll 122 which confronts the thermal printing head 11 through the magnetic medium 10 with the magnet 12 being rotatably mounted around a center rotary shaft 121. In this case, the direction of the biasing magnetic field can be changed as desired and the magnet can be used for forming the uniform magnetization pattern in the magnetic medium.

Furthermore, the magnet 12 in the roll in FIG. 4 may be replaced by an electromagnet so that the polarity can be changed as desired. In this case, both the formation of the uniform magnetization pattern in the magnetic medium and the recording of data in the magnetic medium can be achieved.

In addition, the magnet 12 in the roll 122 may be arranged so as to provide a biasing magnetic field either parallel or perpendicular to the surface of the magnetic medium. Moreover, if a heated roll is employed as the confronting roll 122 in order to preheat the magnetic medium 10, the heat generating elements can be heated with a small amount of energy which makes it possible to increase the data recording speed.

Figure 5:
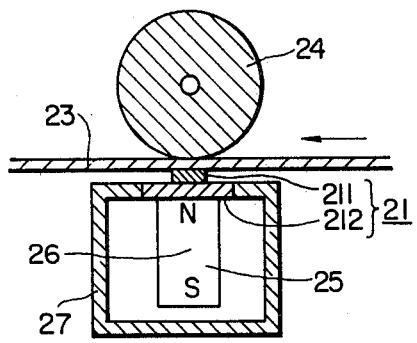
FIGS. 5 through 7 are schematic sectional views showing third through fifth preferred embodiments, respectively, of a magnetic recording device of the invention.

Another embodiment of a magnetic recording device according to the invention, as shown in FIG. 5, includes a thermal printing head 21 having a supporting substrate 212 and a number of heat generating elements 211 which are arranged on the supporting substrate 212 one-dimensionally or perpendicularly to the surface of the Figure, a biasing magnet 25 disposed on the lower surface of the supporting substrate 212, a casing 27 incorporating the magnet 25, and a confronting roll 24 which confronts the thermal printing head 21 through the magnetic medium 23.

A data writing operation with the magnetic recording device in FIG. 5 is carried out as follows. First, a pretreatment is carried out before the recording of data. To accomplish this, the magnetic medium 23 is magnetized to saturation in the direction of the thickness or width thereof so that a uniform magnetization pattern is formed in the magnetic medium 23. Then, when a given point on the magnetic medium 23 passes immediately above the thermal recording head 21, it is locally and selectively heated by selected ones of the heat generating elements 211. During this operation, the temperature of each of the portions of the magnetic medium 23 which are heated by the heat generating elements 211 is raised to a temperature higher than the Curie temperature or compensation temperature of the recording medium 23 as a result of which the portions thus heated are demagnetized.

After the application of current to the heat generating elements is suspended, the temperature of the magnetic medium decreases. When it decreases to a value lower than the Curie temperature, the magnetic medium is magnetized by the magnetic field of the biasing magnet 25. Since the direction of the magnetic field of the biasing magnet 25 applied to the magnetic medium is opposite to the direction of the above-described preliminary magnetization, the heated portions of the magnetic medium are magnetized in the direction which is defined by the magnetic field of the biasing magnet 25. A magnetization pattern different from that produced by the preliminary magnetization is formed on the magnetic medium 23 thus providing a magnetic latent image.

In the above-described magnetic recording device in FIG.5, the biasing magnetic field generating magnet 25 is provided on the supporting substrate 212 in the casing 27 of the thermal printing head 21. Accordingly, only a small space is required for the arrangement of the components and accordingly the magnetic recording device can be made small in size and compact in arrangement.

If in the device in FIG. 5 the magnet 25 is made rotatable around a shaft 26, then not only can the direction of the biasing magnetic field be changed as desired but also the magnet 25 can be used for forming the uniform magnetization pattern on the magnetic medium. Furthermore, if the magnet 25 in the casing 27 in FIG. 5 is replaced by an electromagnet so that the polarity can be reversed as desired, then both the formation of the uniform magnetization pattern on the magnetic medium and the recording of data therein can be achieved.

Figure 6:
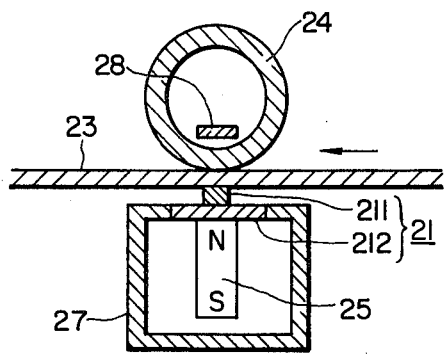

Another embodiment of a magnetic recording device of the invention is shown in FIG. 6. The magnetic recording device shown in FIG. 6 is constructed by providing a yoke member 28 inside the confronting roll 24 in FIG. 5 so that the magnetic flux of the biasing magnet 25 is concentrated at the magnetic medium 23.

Figure 7:
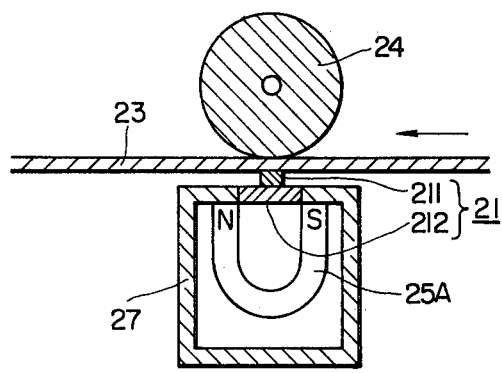

A further embodiment of the magnetic recording device of the invention is shown in FIG. 7 in which a horseshoe-shaped magnet 25A is employed instead of the biasing magnet 25 in FIG. 5. In this embodiment, the magnetic field of the magnet 25A applied to the magnetic medium is a planar magnetic field.

In the embodiment shown in FIGS. 6 and 7, the confronting roll may be made of a magnetic material. Furthermore, if the confronting roll 24 is replaced by a heated roll, so as to preheat the magnetic medium 23, then only a small amount of energy is needed from the heat generating elements 211 with the result that the data recording speed is increased. In addition, the provision of the confronting roll is not always necessary.

What is claimed is:

1. A magnetic recording device comprising:
   a magnetic medium having an initial uniform magnetization pattern in which desired portions are selectively magnetized in a latent image pattern;
   a thermal printing head having a supporting substrate and a plurality of heat generating elements arranged on said supporting substrate, said magnetic medium moving relative to said thermal printing head;
   means for supplying heating current selectively to said heat generating elements according to data to be recorded so that said magnetic medium is locally heated by selected ones of said heat generating elements to a temperature greater than the Curie temperature of said magnetic medium as it moves relative to said thermal printing head;
   a confronting roll disposed confronting said thermal printing head through said magnetic medium; and
   a biasing magnet provided inside said confronting roll for applying a biasing magnetic field to predetermined portions of said magnetic medium which are heated.

2. The magnetic recording device as claimed in claim 1 which further comprises: means for preheating said magnetic medium to a predetermined temperature lower than the Curie temperature thereof.

3. The magnetic recording device as claimed in claim 1 wherein said heat generating elements are arranged one-dimensionally on said supporting substrate.

4. The magnetic recording device as claimed in claim 1 wherein said biasing magnet is rotatably mounted.

5. A magnetic recording device comprising:
   a magnetic medium having an initial uniform magnetization pattern in which desired portions are selectively magnetized in a latent image pattern;
   a thermal printing head having a supporting substrate and a plurality of heat generating elements arranged on said supporting substrate, said magnetic medium moving relative to said thermal printing head;
   means for supplying heating current selectively to said heat generating elements according to data to be recorded so that said magnetic medium is locally heated by selected ones of said heat generating elements to a temperature greater than the Curie temperature of said magnetic medium as it moves relative to said thermal printing head;
   a confronting roll disposed confronting said thermal printing head through said magnetic medium; and
   a biasing magnet provided below said thermal printing head for applying a biasing magnetic field to predetermined portions of said magnetic medium through said thermal printing head.

6. The magnetic recording device as claimed in claim 5 wherein said biasing magnet comprises a bar magnet.

7. The magnetic recording device as claimed in claim 6 wherein said biasing magnet is rotatably mounted.

8. The magnetic recording device as claimed in claim 5 wherein said confronting roll has a hollow inner portion and further comprising a yoke member disposed within said hollow portion confronting said thermal printing head through said magnetic medium.

9. The magnetic recording device as claimed in claim 5 wherein said biasing magnet comprises a horseshoe-shaped magnet.

10. The magnetic recording device as claimed in any of claims 1 or 3–9 wherein said magnetic medium comprises a material selected from the group consisting of copper zinc ferrite, manganese zinc ferrite, nickel zinc ferrite, chromium oxide and Gd-Co alloy.

* * * * *